United States Patent
Araya et al.

(12)

(10) Patent No.: US 6,706,233 B2
(45) Date of Patent: Mar. 16, 2004

(54) METHOD FOR PROCESSING CERAMICS USING ELECTROMAGNETIC ENERGY

(75) Inventors: Carlos R. Araya, Woodhull, NY (US); John H. Brennan, Horseheads, NY (US); Gary G. Squier, Beaver Dams, NY (US); Kathleen A. Wexell, Corning, NY (US); Elizabeth M. Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/029,747

(22) Filed: Dec. 18, 2001

(65) Prior Publication Data
US 2002/0084555 A1 Jul. 4, 2002

Related U.S. Application Data

(60) Provisional application No. 60/258,722, filed on Dec. 29, 2000.

(51) Int. Cl.[7] ............................................. C04B 33/32
(52) U.S. Cl. ...................................... 264/432; 264/630
(58) Field of Search .......................................... 264/630

(56) References Cited

U.S. PATENT DOCUMENTS

| | | | |
|---|---|---|---|
| 4,307,277 A | | 12/1981 | Maeda et al. |
| 4,880,578 A | | 11/1989 | Holcombe et al. |
| 4,963,709 A | | 10/1990 | Kimrey, Jr. |
| 5,191,183 A | | 3/1993 | Balbaa et al. |
| 5,202,541 A | * | 4/1993 | Patterson et al. |
| 5,227,600 A | | 7/1993 | Blake et al. |
| 5,538,681 A | * | 7/1996 | Wu |

FOREIGN PATENT DOCUMENTS

| | | |
|---|---|---|
| EP | 0 500 252 | 8/1995 |
| GB | 2 262 333 | 6/1993 |
| WO | 93/12629 | 6/1993 |
| WO | 95/05058 | 2/1995 |

\* cited by examiner

Primary Examiner—Christopher A. Fiorilla
(74) Attorney, Agent, or Firm—Kees van der Sterre

(57) ABSTRACT

The method for heating a plurality of ceramic bodies, includes:

a) providing ceramic-forming raw materials and blending the raw materials with an effective amount of vehicle and forming aids to form a plastic mixture therefrom and thereafter forming the plastic raw material mixture into a plurality of green bodies;

b) placing each one of the plurality of green bodies in proximity to an adjacent one of the plurality of green bodies such that upon heating with electromagnetic waves each green body is subject to no more than about 1.5 times the power density at the boundary than in the bulk thereof; and c) drying the green bodies utilizing energy in the form of electromagnetic waves.

When the ceramic is a honeycomb cellular cordierite body, the method further includes heating the green bodies up to a maximum temperature of between about 1360° C. and about 1435° C. to produce fired bodies that are predominantly cordierite, wherein the firing includes utilizing a combination of microwave and convective or radiative heating during periods where the green bodies are subject to an endothermic reaction or phase transition.

The method for the firing of a honeycomb cellular cordierite bodies further includes placing each one of the plurality of green bodies in proximity to an adjacent one of the plurality of green bodies within a firing chamber such that upon heating with electromagnetic waves each green body is subject to no more than about 5 times the power density at the boundary than in the bulk thereof.

6 Claims, No Drawings

METHOD FOR PROCESSING CERAMICS USING ELECTROMAGNETIC ENERGY

CROSS-REFERENCE TO RELATED APPLICATIONS

This application claims the benefit of U.S. Provisional Patent Application Serial No. 60/258,722, filed Dec. 29, 2000, entitled "Method for Microwave Processing of Ceramics", by Araya et al. which is herein incorporated by reference in its entirety.

BACKGROUND OF THE INVENTION

1. Field of the Invention

The invention relates to a method for processing ceramic materials. In particular, this invention relates to a method for heating ceramic materials involving the use of electromagnetic energy and optionally firing ceramics involving the use of electromagnetic energy in combination with conventional radiative/convective heating, and more particularly to a method for controlling the power dispersion of the electromagnetic energy by density selection of the pieces to uniformly distribute the heating energy throughout the ceramic material.

2. Technical Background

Conventional heating used in the manufacturing of ceramic materials typically utilizes radiative gas or electric resistance heating. Utilization of conventional radiative/convective heating typically results in a thermal differential within the ceramic material. This differential is due, in part, to the fact that radiant heating is applied only to the surface of the material and it relies on the thermal conductivity of the material, typically poor, to transmit the thermal energy beneath the surface and into the interior or core of the piece. In other words, conventional heating involves heat transfer that is predominantly achieved by radiation or convection to the surface followed by conduction from the surface into the interior of the ceramic body. If a core-surface thermal differential develops that is too great, internal cracking, external cracking, and distortion of the ceramic material can occur. Fast drying or firing further exacerbates this problem of poor heat transfer, and ultimately cracking.

Additionally, the presence of a core-surface thermal gradient can also result in uneven sintering, specifically surface sintering prior to, and at a faster rate than, interior sintering. As a result, the ceramic material may exhibit non-uniform properties.

Solutions to these problems which have been proposed involve reducing the rate of heating or allowing lengthy holds at certain temperatures. Each of these solutions allows heat energy to be conducted into the core of the ceramic material, which in turn, allows the temperature of the core of the ceramic material to "catch up" with that of the surface, thereby minimizing the surface/core temperature differential. Unfortunately however, the theoretical limits of conventional radiative or convective heating typically result in slow heating rates for all ceramic materials, the exception being ceramic pieces exhibiting small dimensions.

Microwave heating of ceramics has alternatively been successfully used to both dry and assist in firing ceramic materials. In comparison with conventional heating, microwave heating involves depositing energy directly within the ceramic material in accordance with a volumetric heating mechanism. More specifically, the utilization of microwave energy involves delivering a uniform application of the energy to the entire cross section of the ceramic article, rather than to the article surface. Although microwave heating of ceramic materials is much faster than conventional radiant heating because of this volumetric heating, it, like radiative heating, results in the ceramic article exhibiting a thermal differential; albeit an opposite thermal differential with the core of the ceramic article exhibiting a higher temperature than that of the surface. Specifically, as the ceramic materials, typically poor absorbers of microwave energy at low to intermediate temperatures, are heated with microwaves at high temperatures, the interior of the ceramic article very rapidly begins to absorb substantial amounts of microwave energy; this effect is known as thermal runaway. Although the surface is heated along with the core of the ceramic material, the surface rapidly loses much of its heat energy to the surroundings, which is typically cooler than the average ceramic material temperature. As the core starts to preferentially absorb the microwave energy this thermal runaway phenomenon becomes self-propagating. Simply stated, as the temperature of the ceramic material increases, the heat losses become greater, and the magnitude of the core-surface thermal differential increases, again leading to thermal stress within, and ultimately cracking of, the ceramic article.

In addition to heat losses from the surface of the ceramic article, non-uniformity of the microwave distribution within the dryer, kiln, furnace, or oven, and non-uniform material properties of the ceramic article lead to differential absorption of the microwave energy by the ceramic article, and contribute to the microwave heating thermal differential.

In the processing of cellular ceramic products, the as-extruded piece is subjected to several steps in which the piece is dried and fired, separately. All steps have specific time-temperature cycles in which the heating rates, hold temperatures, and hold times are all important to the formation of the required physical properties of the body. Using conventional hot air techniques, it can take longer to produce relatively larger parts. Therefore, depending upon the size of the part substantial lead time may be required for delivery of a product in the best of circumstances.

In an effort to alleviate this concern prior methods include the use of a combination of microwave energy and conventional heating techniques (resistive, gas firing, etc.) to process cellular ceramics from extrusion through the firing using one thermal process. This includes drying and firing, and eliminates the handling step (or steps, where the parts are dried twice) between dry and fire. The process can be applied to other cellular ceramic products as well.

Hybrid microwave/conventional heating or microwave assisted heating has been utilized as an alternative to overcome the problems of conventional radiative and microwave-only heating. In microwave assisted heating involving both microwave and radiative/convective heating, the volumetric heating provided by the microwaves heats the components, while the conventional radiative/convective heating provided by gas flame or electric resistance heating elements minimizes heat loss from the surface of the components by providing heat to the surface and its surroundings. This combination or hybrid heating can result in heating that avoids thermal profiles associated with conventional and microwave-only heating. As a result, thermal stresses can be reduced and or minimized and thus the ceramic articles can be heated more rapidly.

Conventional dielectric drying processes and gas firing can be combined in one thermal process by using microwave energy to assist in drying and firing parts faster and with less handling. Microwave drying works on the same principle as do the dielectric dryers, but is of a higher frequency and can be run more efficiently. Microwave assisted firing can reduce thermal gradients through a part during firing, allowing faster heating ramps, usually cutting ramp times by 50% or more of conventional gas firing.

In drying a wet piece, volumetric heating specifically aimed at polar molecules (i.e., water) is a great advantage over conventional methods of drying. This is how current dryers work. The advantages of using microwave drying are two fold. The high frequency of microwave energy allows the use of lower wattage and more efficient drying, while the actual apparatus has a smaller footprint. Also, unlike dielectric dryers, a microwave energy source can be used to assist in firing ceramics. A thermal process set to dry and fire parts would require no handling from the dryer to the kiln, and no cooling and re-heating steps either.

While microwave energy alone can be used to heat cellular ceramics, a much more efficient and reliable method is to meld the current technology in gas fired kilns with microwave assisted heating, creating a hybrid kiln capable of fast firing. Green ware is made up of organic and inorganic materials, and they react in different ways as they are subjected to the time-temperature cycle of firing. The organic materials burn in the presence of oxygen at certain temperatures, while the inorganic materials contain chemically bound water that is driven off.

The two chemical processes are often at odds with each other. The release of heat in the exothermic reaction of the organic binders, and the heat requirement of the endothermic chemically bound water removal cause thermal gradients resulting in thermal/mechanical stress in the parts. The burning of the organic material requires the kiln to be able to extract the heat fast enough so that the core of the piece does not over heat. The removal of chemically bound water requires the kiln to supply the parts with enough heat to prevent a cool core compared to the skin.

During processing, an even power distribution of the microwave energy is important to obtaining uniform properties. For example, during the endothermic removal of chemically (firing) or physically (drying) bound water high amounts of microwave power are used. When the power is not evenly distributed then some wares, or sections of a ware, will receive too much energy, while others may not receive enough. Either case can result in cracking or non-uniform characteristics.

Most cellular ceramic substrates are fired in a fossil fuel tunnel or periodic kiln. Fossil fuel combustion has been the heating method of choice because it offers not only radiative heating, but also convective heating due to the velocity of the flame and products of combustion. Even the utilization of these two heating modes is most often not effective enough to overcome the thermal differences within the piece. Because they are applied only to the surface they must rely on thermal conductivity of the body material to effect the temperature from the skin to the center of the piece. This is exacerbated by the fact that cellular ceramics are by nature of their material and geometry, thermally insulating.

For the reasons mentioned above, as much as 50% of a firing cycle can be simply the time required for heating a piece to the holding temperatures. Microwave radiation will heat an object volumetrically (i.e. the whole part receives the radiation at the same time), and can drastically reduce the amount of time consumed in heating a piece to the hold temperatures by reducing or substantially eliminating the thermal gradient across a piece. The thermal gradients induced by heating a piece too quickly from the outside to the inside can cause cracking, and undesirable or non-uniform properties.

The benefits of volumetric heating extend beyond simply shortening the time requirements for heating ramps. It can also be employed during reactions to control the rate of the reaction and ensure uniformity during phase changes, chemically bound water removal, debind, and sintering. For example, if the piece is entering an endothermic regime where chemically bound water is being removed, the skin of the part will consume most of the energy available, leaving the core cold, and the skin shrinking. This causes not only thermal gradient stresses, but also mechanical stress related to differential shrinkage. Using a combination of conventional and microwave energy, heat is distributed to the core and skin and the stress mentioned above during these critical regions of the firing cycle are negligible. It is not difficult to imagine the benefits during other parts of the cycle, such as sintering.

Similar phenomenon are known to occur during drying. For example, as the ceramic ware dries it loses its elasticity and/or shrinks. If there are any differential stresses caused by shrinkage the body is susceptible to cracking. It is therefore important to balance the evaporation of water from the outside surface with that of the removal of water (evaporative or osmotic) from the center of the ceramic ware.

Microwave energy of frequencies supplied by inexpensive and reliable magnetrons are commercially available, affordable, and suitable for processing cellular ceramics. The technology in which hybrid gas firing and microwave heating are combined is known.

Although, various methods of implementation have been proposed, it can be difficult to coordinate the respective microwave and conventional energy inputs to achieve optimal uniform heating of the ceramic article. Variations on microwave-assisted ceramic firing standard control methods are disclosed in PCT Applications WO 95/05058 and WO 93/12629 and U.S. Pat. No. 5,191,183. These documents generally disclose methods of independently controlling the quantities of heat generated in the ceramic article by the microwave energy and radiant heat by measuring the ambient temperature within an enclosure containing the ceramic article. Based on, and in response to, this ambient temperature measurement, the heat generated in the ceramic article is controlled by one or both of the microwave energy or radiant heat. Although this type of control method is an improvement over prior conventional control methods, the non-uniform mixing of kiln gases and the effects of chemical reactions that occur within the ceramic material make it difficult to accurately predict the ceramic article surface and internal temperatures.

Heating uniformity is of paramount importance in most industrial heat treating applications. Typically, multiple ceramic articles are placed within the kiln to increase productivity. This increases the importance of uniform distribution of suitable amounts of thermal energy within the kiln to assure that each ceramic piece is fired properly, thus avoiding burning, cracking or other undesirable results. One problem encountered in treating multiple articles with microwave energy is known as the boundary effect. This effect tends to cause an uneven power distribution of microwave energy directed to the boundary of the article, the interface of the ware with its surroundings (generally the atmosphere in the kiln or dryer).

The art lacks a solution capable of providing to multiple pieces uniform power dispersion within each piece, general applicability to a wider variety of sample compositions (although during any one firing the composition is substantially the same), a variety of ware sizes and geometry, a better pore size distribution, increased strength and thermal shock resistance, decreased coefficient of thermal expansion and eliminating internal and external cracks.

Also lacking is a process that provides increased throughput (shorter time-temperature cycle) during critical regions which were previously slowed down significantly because of the inefficiencies associated with surface heating from the combustion heating process.

SUMMARY OF THE INVENTION

Accordingly, it is an aspect of this invention to provide a method for heating a plurality of ceramic bodies, including:

a) providing ceramic-forming raw materials and blending the raw materials with an effective amount of vehicle and forming aids to form a plastic mixture therefrom and thereafter forming the plastic raw material mixture into a plurality of green bodies;

b) placing each one of the plurality of green bodies in proximity to an adjacent one of the plurality of green bodies such that upon heating with electromagnetic waves each green body is subject to no more than about 1.5 times the power density at the boundary than in the bulk thereof; and c) drying the green bodies utilizing energy in the form of electromagnetic waves.

According to another aspect of the present invention, when the ceramic is a honeycomb cellular cordierite body the method further includes heating the green body up to a maximum temperature of between about 1360° C. and about 1435° C. to produce a fired body that is predominantly cordierite, wherein the firing includes utilizing a combination of microwave and convective or radiative heating during periods where the green body is subject to an endothermic reaction or phase transition.

According to another aspect of the present invention, the firing of a honeycomb cellular cordierite body further includes placing each one of the plurality of green bodies in proximity to an adjacent one of the plurality of green bodies within a firing chamber such that upon heating with electromagnetic waves each green body is subject to no more than about 5 times the power density at the boundary than in the bulk thereof.

DETAILED DESCRIPTION OF THE INVENTION

The present invention relates to a method for heating a plurality of ceramic bodies. The present invention was developed, in part, from the recognition that the manner in which the ware is placed in the kiln or dryer can affect the power distribution by avoiding unnecessary boundary conditions. Boundary conditions will always exist at the edges of a load, but judicious placement of pieces within a load in accordance with the present invention will eliminate boundary conditions within the load or between the pieces. The pieces need not be of the same size and geometry within a given load, however, they are preferably of a similar composition.

Ceramic-forming raw materials are blended with an effective amount of vehicle and forming aids to form a plastic mixture. The mixture is thereafter formed into a plurality of green body pieces. Additionally, one or more green body pieces can be formed in different sizes and geometry from a similar formulation, e.g., formulations preferably within 10% of the E" value of the material. The E" value is the complex Dielectric constant of the material. It is a positive number for "lossy" materials, that is materials that are heated by electromagnetic fields, the higher the number the more susceptible the material is to the loss mechanism.

Each one of the plurality of green body pieces are placed in proximity to an adjacent piece such that upon heating with electromagnetic waves each green body is subject to no more than about 1.5 times the power density at the boundary of either the piece or the load than in the bulk thereof. The green bodies are then dried utilizing energy in the form of electromagnetic waves. In conventional systems it is difficult to achieve uniform heating conditions with multiple pieces and this problem is typically addressed by providing more space around each piece. In contrast, according to the present invention, uniform heating is achieved in a close packed system.

Suitable forms of electromagnetic energy include microwave and radio frequency ("RF") energy. The electromagnetic field may be in a variety of frequency ranges or microwave energy at standard frequencies or other frequencies as required. When microwave energy is utilized, the distance between adjacent bodies is preferably no more than about ½ the wavelength of the microwave energy used. When RF energy is utilized, each green body is subject to no more than about 1.5 times the power density in the two dimensions at the boundaries parallel with the field than in the bulk thereof, wherein the distance is perpendicular to the field of the RF energy. For example, electromagnetic fields are oriented perpendicular to the electrodes when the dielectric in between the plates is air or a vacuum. However, a dielectric material will distort the field and cause "end flare" effects and uneven power distribution in the materials being heated as a function of the proximity, dimensions and lossiness of the material. This results in increased heating at leading and following edges of a load. By packing the ware in such a manner as to eliminate the leading and following edges, the boundary effects can be avoided.

Green body pieces suitable for processing in accordance with the invention may be composed of any of a variety of different ceramic materials. The process offers particular advantages for the firing of honeycomb cellular ceramics composed of cordierite; zircon refractories; silicon carbide honeycombs; and other oxide honeycomb ceramics composed of mullite, aluminum titanate or the like.

The present invention provides a method to control the drying rate and firing of ceramic bodies, in a dielectric field, particularly compositions using high organic contents. Typical drying applications rely on the control of power and or belt speed to manage the drying rate of the ceramic body thus avoiding "skin" defects such as blisters and fissures.

This invention takes advantage of the recognition of the ability of dielectric materials to distort electromagnetic fields. This distortion and displacement of the electromagnetic field results in an attenuation of the effective power applied to the ceramic bodies when the ceramic bodies are in close proximity. Conventional thinking relies on reducing applied power and or increasing belt speeds to reduce drying rates. Such an approach actually focuses more energy on the pieces because the distance between the ceramic bodies maximizes field distortions or attenuation of the electromagnetic field, therefore concentrating the field on one part. In contrast, in accordance with the present invention, by increasing the piece density of ceramic bodies in a carrier or in the drying zone at any given time, the attenuation effect disperses the power being applied to the individual pieces, thus allowing even drying with no defects. We have discovered that power can be distributed more evenly throughout a dense object or a densely packed array of objects. This eliminates or reduces the amount of edge heating which leads to cracking during drying.

The goal of drying is to remove the moisture as rapidly as possible and maintaining a small deviation of temperature from the core to skin of the piece, this is achieved by distributing the energy more evenly, in all the dimensions of the load.

It has been found that the energy density variation within the ware can be maintained at less than about 20% during drying, and 50% during hybrid firing, and the power to the ware can be increased beyond levels that would heretofore produce hot spots or thermal runaway, provided that the wares are densely packed in accordance with the present invention. Energy variation through space typically exhibits a relationship with energy input, however, the variation drops off when the ware is densely packed. As temperature is increased, the energy variation actually decreases in hybrid heating and more power is able to be absorbed by the ware. Thus, a higher energy density within the ware can be achieved than was possible with conventional methods.

The method of the present invention is explained with respect to ceramic honeycomb substrates but applies to any application where the dielectric characteristics of the material make it sensitive to rapid heating and distortion of the material being processed.

This invention refers to "blisters" and "fissures" or "grooves" as typical skin defects but such defects also include cracking and distortion of the ceramic body.

One suitable application is the control of the tray proximity in existing RF dryers to minimize start-up and job change related defects when the dryer is partially full. In this instance the dryer loading can be determined by counting the incoming trays and factoring the belt speed so as to maintain the desired spacing.

This invention utilizes the application of microwave energy into continuous and periodic gas fired kilns during important temperature regions of the firing cycle of cellular ceramics, especially but not limited to the endothermic reaction regions where chemically bound water is driven out of the product. During firing of a honeycomb cellular cordierite ceramic each one of the plurality of green body pieces are placed in proximity to an adjacent green body piece within a firing chamber such that upon heating with electromagnetic waves each green body is subject to no more than about 5 times the power density at the boundary than in the bulk thereof.

The method includes heating the green bodies up to a maximum temperature of between about 1360° C. and about 1435° C. to produce fired bodies that are predominantly cordierite, wherein the firing includes utilizing a combination of microwave and convective or radiative heating during periods where the green bodies are subject to an endothermic reaction or phase transition. More specifically, the phases that the green bodies are subject to an endothermic reaction or phase transition include the clay water loss region ranging from a temperature of from about 450° C. to about 600° C. and the talc water loss region ranging from a temperature of from about 830° C. to about 1000° C. Other regions benefiting from microwave's increased thermal uniformity within the piece include the hydrocarbon/binder burnout regions (100° C. to 450° C.) and the high temperature sintering/hold temperatures above 1250° C.

In the firing of cellular ceramic substrates, the green piece is subjected to a specific time-temperature cycle. The heating rates, hold temperatures and hold times are all important in the formation of the required physical properties within the ceramic body. The batch materials are made up of organic and inorganic materials. These batch materials react in different ways as they are subject to the time-temperature cycle. The organic materials begin to burn in the presence of oxygen at certain temperatures, releasing heat. Some inorganic materials contain chemically bound water, which is driven off at a certain temperature, depending on the inorganic material. The chemically bound water removal requires heat. The release of heat (exothermic reaction) of the organic materials and the heat requirement (endothermic reaction) of driving the chemically bound water in the inorganic materials cause thermal differences between the center of the piece and the surface.

Most cellular ceramic substrates are fired in a fossil fuel tunnel kiln or periodic kiln. Fossil fuel combustion process has been the heating method of choice because it offers not only radiative heating, but also convective heating due to the velocity of the flame and products of combustion. Even the utilization of these two heating modes are most often not effective enough to overcome the thermal differences within the piece because these two heating modes are applied only to the surface and rely on thermal conductivity of the body material to effect the temperature beneath the surface to the center of the piece.

Microwave energy can be applied at any frequency within the full range of commercially available microwave frequencies, such as 915 MHz and 2.45 GHz, respectively. Various multiple microwave frequencies can be utilized as the time temperature cycle progresses to result in the best piece thermal uniformity, matching materials, temperature and microwave frequency, provided proper choking and frequency matching of output generators is maintained. Sweeping frequency microwave generators are an alternative in periodic kilns where multiple frequencies are desired throughout the time-temperature cycle.

Microwave energy was selected due to the uniform application of the energy to the piece. As stated earlier, conventional combustion technology only applies heat to the piece surface. Susceptor plates made of silicon carbide or similar materials can be used to assist the fossil fuel heating mode to raise the piece temperature to a temperature at which the ceramic article begins to couple into the microwave energy being applied. These susceptor plates can also be used to shape or concentrate the microwave energy to certain locations in the kiln or on the piece.

The benefits of this invention due to uniform piece temperatures include, but may not be limited to increased strength and thermal shock resistance, decreased coefficient of thermal expansion, internal/external cracks and consistent porosity characteristics. Also achieved is increased throughput (shorter time temperature cycle) because these important regions were previously slowed down significantly because of the inefficiencies associated with surface heating from the combustion heating process.

A basic system for heating ceramic materials according to the present invention described herein. This system preferably includes a microwave resonant cavity, having a thermally insulated wall, within which is located a ceramic article to be heated. A microwave generator, for example a magnetron, is coupled directly or indirectly to the cavity by a configuration of waveguides. The system includes a microwave power source/controller for continuously adjusting the microwave power and optionally an independently controlled conventional heat source/controller, configured to conventional heat within the thermally insulated enclosure. It is contemplated that the conventional heat source can constitute, convective or radiative heat, including, but not limited to, conventional electric resistance or gas heating in either a direct or indirect burner configuration.

The microwave kiln typically includes of a shell of non-magnetic material such as aluminum or 300 series stainless steel. The shell is lined on all inside walls with high temperature, low loss insulation such as high purity alumina ceramic fiber. The waveguide ports or openings are protected from the kiln atmosphere by a vapor shield that may be made of high purity quartz glass or other low loss materials such as mica. This vapor barrier is joined to the waveguide by silicone rubber cement. At the bottom of the kiln a car contains the article to be heated, the kiln car has one or more shelves and supports of high temperature material such as silicon carbide, the shelves support the article. It is important that the kiln cars have microwave chokes between the wall of the kiln and the car metal to provide a path for the energy and to avoid leakage of microwave to the area surrounding the kiln or the equivalent.

The generator source employed to generate the microwaves can constitute any conventional magnetron with an adjustable power feature. The frequency of incident microwave used is preferably either about 915 MHz or about 2.45 GHz, which is the designated industrial bands in the United States. In the United States and in other countries, frequencies up to 28,000 MHz are known to be utilized. Furthermore, the power of the incident microwave need be no greater than that sufficient to raise the temperature of the ceramic article to a temperature effective for heating of the ceramic article. Specifically, the microwave generator should possess variable power levels ranging up to 75 kW and beyond.

A temperature measurement system capable of measuring both the ceramic article's surface temperature and the temperature proximate the center of the ceramic article, i.e., the core temperature, is coupled to a control unit, that independently controls the microwave power source/controller and the conventional heat source/controller. This control unit preferably includes a combination of a programmable logic controller (PLC) and a personal computer (PC). The temperature measurement system constitutes any appropriate temperature sensor capable of measuring both surface and core temperature of the ceramic article. The term core as used throughout refers to the interior portion of the ceramic article at or near the center of the particular ceramic article, however the core temperature can be measured at any position in the interior of the ceramic article that accurately reflects the temperature of the core. Suitable sensors include, for example, a pyrometer (or other thermographic device), a sheathed thermocouple, light pipe or black body probe. In a preferred embodiment the sensors constitute sheathed thermocouples including a forwardly extending temperature probe in the form of a type S, or type B, thermocouple housed in a platinum or other metallic high temperature sheath that is grounded to the kiln shell.

Further, core temperatures can be measured by a reflected power scheme. In a microwave unit the magnetron outputs the microwave energy based on the command signal given to the magnet and filament control. The energy travels in the waveguide and to the cavity, in the cavity the energy is absorbed by the load and reflected by the cavity walls or other reflecting surfaces. The energy that is not absorbed by the ware is reflected back in the waveguide. The reflected power is a measure of the amount of load in the cavity or is dependent on the dielectric characteristics of the load in the cavity. By monitoring the reflected power during the cycle the physical status of the load can be ascertained and the microwave power controlled to deliver the required energy to the load.

In operation, the ceramic material is subjected to an amount of heat energy by irradiating it with a combination of electromagnetic microwave radiation and by subjecting the ceramic article to conventional heat. The amount of microwave radiation and conventional heat are such that the ceramic article is heated according to a predetermined time-temperature profile. The time-temperature profile, ranging from room temperature to the sintering soak temperature, is determined so as to heat the ceramic article to its sintering soak temperature in the minimum time while still allowing for the production of a ceramic article that, following the subsequent hold at the sintering soak temperature, exhibits the required characteristics of the ceramic material, specifically, a crack-free, undistorted ceramic article.

Commercial operation of the method of the present invention would involve placing the ceramic material in a microwave heating apparatus having a microwave cavity and subjecting the ceramic material to microwave radiation in combination with conventional heat energy according to a predetermined time-temperature profile.

It should be understood that while the present invention has been described in detail with respect to certain illustrative and specific embodiments thereof, it should not be considered limited to such. It is contemplated that numerous modifications are possible without departing from the broad spirit and scope of the present invention as defined in the appended claims.

What is claimed is:

1. In the method for manufacturing a plurality of ceramic bodies by:

providing ceramic-forming raw materials and blending the raw materials with an effective amount of vehicle and forming aids to form a plastic mixture therefrom; forming the plastic raw material mixture into a plurality of green bodies;

placing each one of said plurality of green bodies in proximity to an adjacent one of said plurality of green bodies; and drying the plurality of green bodies with microwave energy, the improvement wherein:

the green bodies are ceramic honeycomb bodies and the plurality of green bodies is subjected to microwave energy in a densely packed array with spacing between adjacent bodies at no more than ½ the wavelength of the microwave energy such that each green body is subject to no more than about 1.5 times the power density at the boundary than in the bulk thereof.

2. The method of claim 1, wherein said ceramic honeycomb bodies are cordierite honeycomb bodies.

3. The method of claim 2 which comprises the further step of:

firing the plurality of green bodies up to a maximum temperature of between about 1360° C. and about 1435° C. to produce fired bodies that are predominantly cordierite, wherein the firing comprises:

utilizing a combination at microwave and convective or radiative heating during periods where the green bodies are subject to an endothermic reaction or phase transition, while maintaining each one of said plurality of green bodies in proximity to an adjacent one of said plurality of green bodies such that each green body is subject to no more than about 5 times the microwave power density at the boundary than in the bulk thereof.

4. The method of claim 3, wherein the firing comprises utilizing a combination of microwave and convective or radiative heating during the clay water loss region ranging from a temperature of from about 450° C. to about 600° C.

5. The method of claim 3, wherein the firing comprises utilizing a combination of microwave and convective or radiative heating during the talc water loss region ranging from a temperature of from about 830° C. to about 1000° C.

6. The method of claim 1, wherein said ceramic honeycomb bodies are silicon carbide honeycomb bodies.

* * * * *